A. F. PIEPER.
ELECTRIC MOTOR REGULATION.
APPLICATION FILED APR. 26, 1905.
985,932.
Patented Mar. 7, 1911.
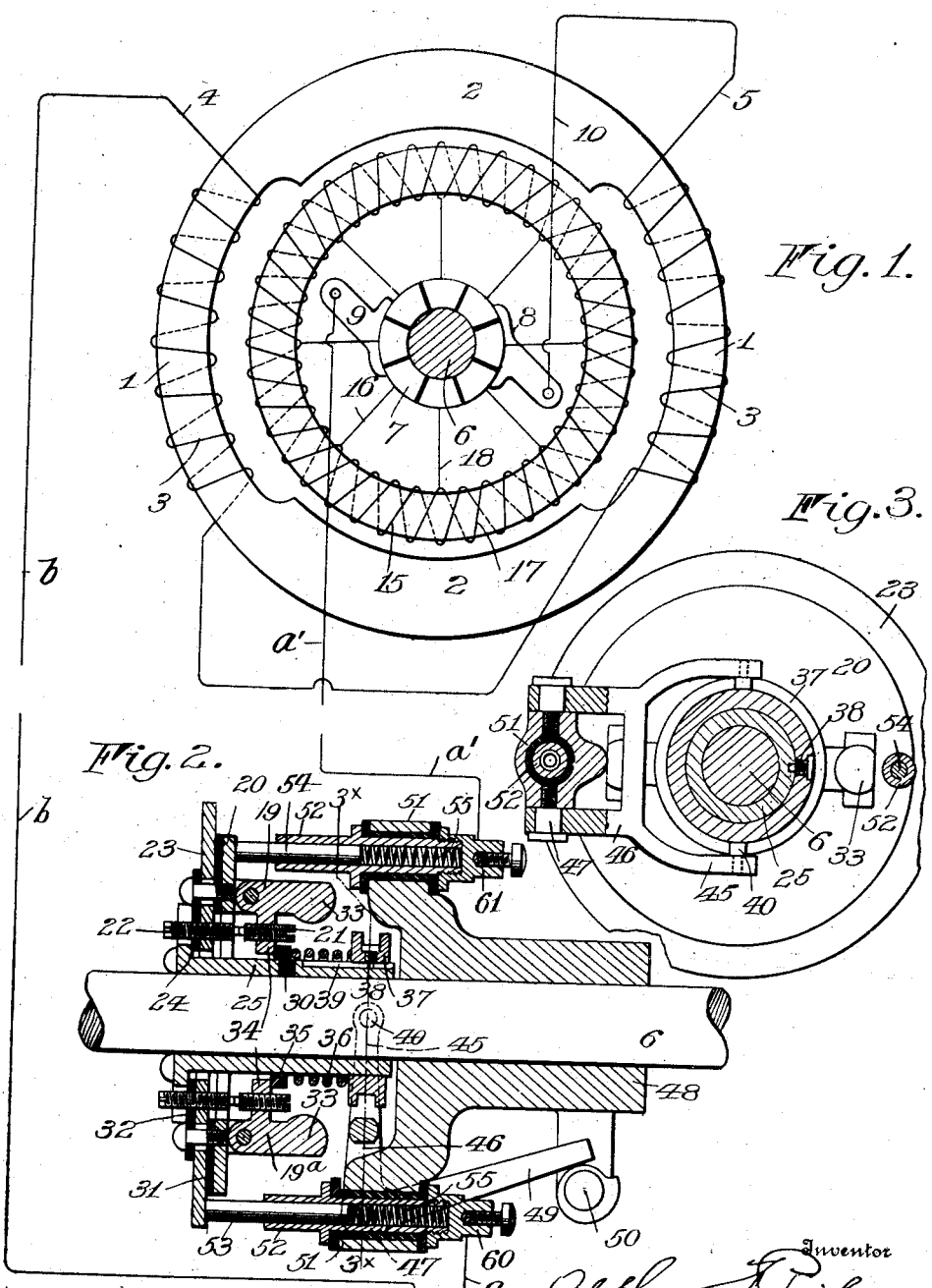

UNITED STATES PATENT OFFICE.

ALPHONSE F. PIEPER, OF ROCHESTER, NEW YORK.

ELECTRIC-MOTOR REGULATION.

985,932.

Specification of Letters Patent. Patented Mar. 7, 1911.

Application filed April 26, 1905. Serial No. 257,423.

*To all whom it may concern:*

Be it known that I, ALPHONSE F. PIEPER, of Rochester, in the county of Monroe and State of New York, have invented certain new and useful Improvements in Electric-Motor Regulation; and I do hereby declare the following to be a full, clear, and exact description of the same, reference being had to the accompanying drawings, forming a part of the specification, and to the reference-numerals marked thereon.

My present invention has for its object to provide a motor adapted particularly to operate under the influence of alternating currents, the speed of which is capable of regulation by governing devices which mechanically interrupt the current as distinguished from electrical devices, such as rheostatic resistances which govern the speed of the motor by reducing the electromotive force of the current.

My invention has for its further object to provide a motor capable of operation with alternating currents of different voltage, or of different frequency, whereby they may be operated at any desired speed with a minimum watt consumption and without sparking between the commutator sections and brushes.

To these and other ends the invention consists in certain improvements and combinations of parts all as will be hereinafter more fully described, the novel features being pointed out in the claims at the end of the specification.

In the drawings: Figure 1 is a diagrammatic view illustrating a motor embodying the invention. Fig. 2 is a detail sectional view illustrating a form of governing device. Fig. 3 is a cross sectional view taken on the line 3ˣ 3ˣ of Fig. 2.

Similar reference numerals in the several figures indicate similar parts.

My invention relates particularly to that class of motors known as direct current type. alternating current motors which are usually constructed with field magnets having laminated cores, an armature provided with one or more windings, connected to commutator sections, and brushes engaging one or more of the latter.

Alternating current motors are designed to produce the greatest percentage of efficiency by proportioning the windings of the field magnets and those of the armature relatively to each other so that the electromotive force of the armature coils equals, as nearly as possible, the impressed electromotive force of the field windings. The speed of such a motor is regulated or controlled by interposing in the main or supply circuit variable resistances such as a rheostat which reduce the electromotive force of the current with a resultant loss of electric energy consumed by such resistance. By constructing a motor as hereinafter described, whereby I am able to eliminate sparking between the brushes and commutator, a governing device may be employed to automatically open and close the main or supply circuit to regulate the speed of the motor thus effecting a saving of the current, which would otherwise be consumed by the rheostatic resistance, and producing a corresponding increase in the efficiency of the motor.

In constructing my motor I employ the usual laminated field magnets 1, which may be of the ring form, as shown, or otherwise constructed and provided with the pole pieces 2 and the field coils 3 the terminal wires thereof being indicated by 4 and 5. The armature is mounted on a shaft 6 and is provided with a plurality of commutator segments 7 with which coöperate the brushes 8 and 9. In illustrating my invention I have shown a motor in which the field and armature coils are connected in series by joining the terminal 5 of one of the coils to between the various portions of the armature windings are proportioned in relation to the field magnet coils 3 so that when the maximum magnetic strength is developed therein the resultant short circuit current, between the variour portions of the armature windings, due to transformer action, does not produce sparking upon the making or breaking of the circuits established by the commutator sections passing into and out of engagement with the brushes. One continuous winding or coil may be provided on the armature, as indicated by 15, and connected at different points to the various commutator segments by wires 16 or, additional windings, or coils, 17 may be arranged in parallel and connected to alternate segments of the commutator, as shown by the wires 18. When a plurality of such coils are employed the brushes 8 and 9 are adapted to bridge two or more segments, the relative relations between the field coils and the separate coils of the armature being such that the voltage and current of the latter circuits are reduced so that the usual sparking caused by breaking the circuits of an armature having parallel windings is eliminated. It is impracticable to state any definite ratio between the number of turns of wire on the field and armature coils for those on the latter are dependent upon the design of the field magnet frame and the armature core and they must necessarily vary to meet various electrical conditions. The relative proportioning between the active iron and the copper is of course dependent upon the design of the field magnet frame and the armature core, but it is not necessary to take these factors into consideration, as the proportioning of the iron to the copper relates more directly to the efficiency of the motor while the sparking is controlled by the proportioning of the turns of wire on the armature to the turns of wire on the poles of the field magnet, it being of course presupposed that in building an efficient motor the field magnet windings will be built up so as to give the desired strength. A rule by which the armature windings can be determined is as follows: The maximum magnetic flux which the field magnets of the motor will stand without undue heating is first determined and the field magnet coils wound to produce this flux when the motor is developing full power under the maximum amperes of current flowing. With the foregoing as a basis, the armature windings for a given motor are first determined by experiment to ascertain the amount of current that can be safely handled in the short-circuited coils under commutation without causing undue sparking at the commutator and brushes and the armature coils are then built up with the number of turns of wire which will carry said current when the motor is operating at full load, or at maximum ampere capacity without sparking. In practice, this results in making the turns of wire on the armature considerably less in number than the turns on a direct current type motor designed for alternating current. This may also be stated as follows: Given a direct current type alternating current motor, in which the electromotive force generated in the armature is, as nearly as possible, equal to the impressed electromotive force, reduce the turns of wire of the armature coils to that number which permits its rotation without producing sparking between the commutator sections and brushes when operating under the maximum amount of current for which the motor is designed. This rule applies when it is desired to alter a motor heretofore constructed, but it will be readily understood as furnishing a standard for reference in building a motor in the first instance, although the rule for such procedure may be expressed in other words, namely, in building a motor, after the field coils of the desired strength have been provided for the field magnets, make the coils on the armature core with the number of turns of wire required to bring its electromotive force to the highest point where sparking does not occur between the commutator sections and brushes when the motor is operated under full current.

In order to control the high velocity developed by the armature of a motor constructed in accordance with my invention I employ means, for breaking or interrupting the main or supply circuit, in the form of an automatic governor, operated by the armature and which is adjustable to adapt the motor to operate at different speeds and under different loads.

The speed of the motor constructed as above described is not dependent on the turns of wire on the armature and the magnetic field strength, as is ordinarily the case, but by reason of the addition of the governor thereto the turns of wire per coil on the armature can be built up to such a number of turns that under all working loads up to full load or up to the maximum current consumption for which the motor is designed, the current, generated in the short-circuited coils under commutation on the armature will not produce destructive sparking at the commutator and brushes. It will be seen then that a governor which automatically interrupts the current performs a dual function in that it permits speed regulation in an alternating current series motor and enables the armature windings to be built so that the motor will not spark. This is important because, as before stated, the speed of rotation of the armature when running free is not dependent upon the number of turns of wire in its coils, as is the case when no governor is employed, but on the contrary the speed is dependent upon the governor which fact obviates, when building such a motor, the necessity of considering the counter electromotive force of the armature as a factor, it being only necessary to give attention to the elimination of destructive sparking at the commutator and brushes. In the present instance I have illustrated one form of governor adapted for accomplishing these objects comprising a movable contact member 19 pivotally mounted on a ring or other support 20 attached rigidly to the armature shaft 6 and carrying an adjustable contact point formed by a screw 21 which coöperates with and normally engages a similar point 22, mounted on an annular plate 23. In practice the plate 23 is mounted on a flange 24 of a sleeve 25 attached to the shaft 6 by a set screw 30 and secured thereto is the ring 20, of smaller diameter, said plate and ring being separated by insulating material 31 and also insulated from the shaft 6 by insulation 32. If desired additional contact members may be provided between the plate 23 and the ring 20 as indicated by 19ª. Each contact member is provided with an onwardly extending weighted end 33 and a finger 34 projecting into proximity with the sleeve 25 against which bears a collar 35 movable longitudinally on the sleeve and normally operated in one direction by a coil spring 36. Also mounted on the sleeve is an adjustable ring 37, held in position thereon by a screw 38 resting in a groove or slot 39, and having an annular channel in which rest pins 40 on arms 45 of a bifurcated lever 46 pivoted at 47 to a stationary portion of the motor, such as one of the bearings 48 supporting the armature shaft. Extending outwardly from the lever 46 is an operating arm 49 resting upon a cam 50 the rotary adjustment of which causes a corresponding movement of the ring 37 to increase or decrease the tension of the spring 36 and control the opening movement of the contact member or members. Extending laterally from the bearing 48 are arms 51 in which are mounted insulated tubular guides 52 supporting brushes 53 and 54 engaging the plate 23 and the ring 20, respectively, and held in yielding engagement therewith by springs 55 held in position by removable caps 60 and 61. The foregoing devices are interposed in the main, or supply circuit of the motor, and for the present Fig. 2 may be considered as a continuation of Fig. 1. One side of the main circuit is represented by the wires a—a', the former leading to the cap 60, and the latter leading from the cap 61 to the brush 9. The other side of the main circuit is the wire b leading directly to the terminal 4 of the field coils 3. From this it will be seen that an electric current passing over the feed wire a flows through the brush 53 to the plate 23, contact point or points 22, to the point or points 21 on the movable contact member, or members 19 19ª, thence to the ring 20, the brush 54, conductor a', brush 9, when the current after traversing the armature windings, passes through the brush 8, conductor 10, field coils 3 completing circuit through the feed wire b. This circuit it will be seen exists only when the speed of the motor is such that the movable contact member, or members, are not operated to disengage the contact points 21 and 22 and that if the speed of the armature becomes excessive the centrifugal force imparted to the movable member, or members, will cause them to be rotated outwardly to interrupt the flow of current until the speed of the armature has been reduced. By designing the armature coils, in accordance with my invention, all short circuit currents, of sufficient strength to cause destructive sparking, are eliminated and the motor may be operated at different speeds by the adjustment of the governing devices.

From the foregoing it will be understood how my invention provides a motor of the series direct current type for alternating current which will operate without a load on any commercial frequency of current alterations at any desired speed without sparking at the commutator and brushes, thus providing a motor to which a load can be applied or removed instantly and when running free will not spark at the commutator or brushes.

I claim as my invention:

1. An alternating current commutator motor having a small number of active turns included in the armature circuit and producing a much lower counter electromotive force under speed conditions than the impressed electromotive force, whereby no injurious sparking at the commutator will result, and a circuit interrupter actuated by the armature.

2. An alternating current motor of the direct current type, comprising field windings and armature coils connected in series, the active turns of the armature coils producing a small counter electromotive force insufficient to control the speed of the armature, and means operated by the rotation of the armature for interrupting the motor circuit when a certain speed is attained.

ALPHONSE F. PIEPER.

Witnesses:
G. WILLARD RICH,
RUSSELL B. GRIFFITH.